(12) United States Patent
Spas

(10) Patent No.: US 11,011,948 B2
(45) Date of Patent: May 18, 2021

(54) ROTOR, METHOD FOR PRODUCING A ROTOR, RELUCTANCE MACHINE, AND WORKING MACHINE

(71) Applicant: ContiTemic microelectronic GmbH, Nürnberg (DE)

(72) Inventor: Sachar Spas, Berlin (DE)

(73) Assignee: VITESCO TECHNOLOGIES GERMANY GMBH, Hanover (DE)

( * ) Notice: Subject to any disclaimer, the term of this patent is extended or adjusted under 35 U.S.C. 154(b) by 30 days.

(21) Appl. No.: 16/313,444

(22) PCT Filed: Jun. 28, 2017

(86) PCT No.: PCT/EP2017/065975
§ 371 (c)(1),
(2) Date: Dec. 26, 2018

(87) PCT Pub. No.: WO2018/002128
PCT Pub. Date: Jan. 4, 2018

(65) Prior Publication Data
US 2019/0165624 A1    May 30, 2019

(30) Foreign Application Priority Data

Jun. 30, 2016  (DE) ..................... 10 2016 211 841.2

(51) Int. Cl.
*H02K 1/24* (2006.01)
(52) U.S. Cl.
CPC .................. *H02K 1/246* (2013.01)
(58) Field of Classification Search
CPC .................. H02K 1/246; H02K 1/24
(Continued)

(56) References Cited

U.S. PATENT DOCUMENTS

| 6,239,526 B1 * | 5/2001 | Oh ........................ H02K 1/246 310/162 |
| 10,305,336 B2 | 5/2019 | Lange et al. |

(Continued)

FOREIGN PATENT DOCUMENTS

| DE | 10 2014 000 720 A1 | 8/2014 | ............... H02K 1/24 |
| DE | 10 2014 014 487 A1 | 8/2015 | ............... H02K 1/22 |

(Continued)

OTHER PUBLICATIONS

Sanada, "Torque Ripple Improvement for Synchronous Reluctance Motor using Asymmetric Flux Barrier Arrangement", Department of Electrical and Electronic Systems, 38$^{th}$ IAS Annual Meeting on Conference Record of the Industry Applications Conference, 2003, vol. 1, pp. 250-255, Oct. 2003.

(Continued)

*Primary Examiner* — Tulsidas C Patel
*Assistant Examiner* — Robert E Mates
(74) *Attorney, Agent, or Firm* — Slayden Grubert Beard PLLC

(57) ABSTRACT

Various embodiments may include a rotor for a reluctance machine comprising: an essentially disc-shaped rotor body mounted on a rotor axis running through a rotor center point; and an alternating sequence of barrier regions and pole regions arrayed along a circumferential direction of the rotor body. Each barrier region includes a multiplicity of magnetic flux barriers spatially and materially separated without overlap. Within at least one barrier region, at least one magnetic flux barrier is arranged with a q axis and/or a figure axis rotated with respect to a q axis and/or figure axis of another magnetic flux barrier of the same barrier region.

6 Claims, 11 Drawing Sheets

(58) Field of Classification Search
USPC .......... 310/156.53, 156.57, 156.83, 216.106, 310/216.107, 216.108
See application file for complete search history.

(56) References Cited

U.S. PATENT DOCUMENTS

| | | | |
|---|---|---|---|
| 2001/0026108 A1* | 10/2001 | Tajima | H02K 1/246 310/156.01 |
| 2003/0111927 A1 | 6/2003 | Takita et al. | 310/261.1 |
| 2005/0269888 A1* | 12/2005 | Utaka | H02K 1/276 310/156.53 |
| 2007/0210729 A1 | 9/2007 | Kamiya | 318/139 |
| 2010/0117479 A1* | 5/2010 | Eastham | H02K 3/18 310/198 |
| 2014/0265704 A1* | 9/2014 | Rhyu | H02K 21/46 310/156.38 |
| 2019/0165624 A1 | 5/2019 | Spas | |

FOREIGN PATENT DOCUMENTS

| | | | | |
|---|---|---|---|---|
| WO | 2013/131795 A2 | 9/2013 | ............... | H02K 1/27 |
| WO | 2018/002128 A1 | 1/2018 | ............... | H02K 1/24 |

OTHER PUBLICATIONS

International Search Report and Written Opinion, Application No. PCT/EP2017/065975, 20 pages, dated Sep. 20, 2017.
Chinese Office Action, Application No. 201780040764.5, 21 pages, dated Apr. 24, 2020.

* cited by examiner

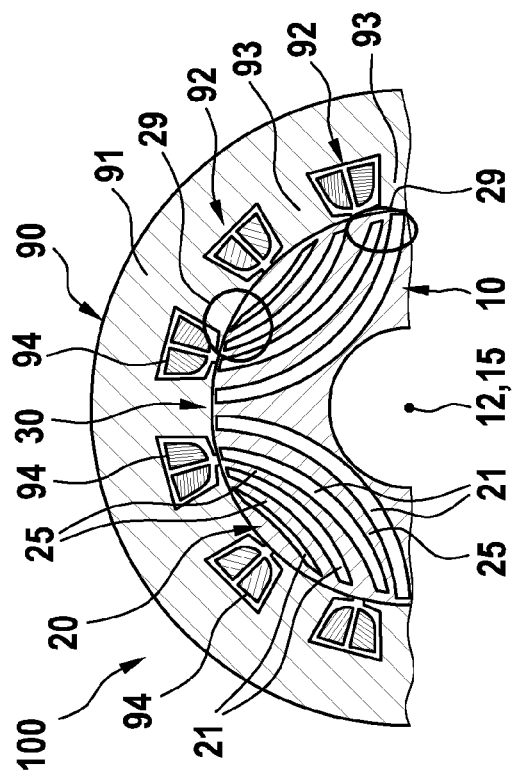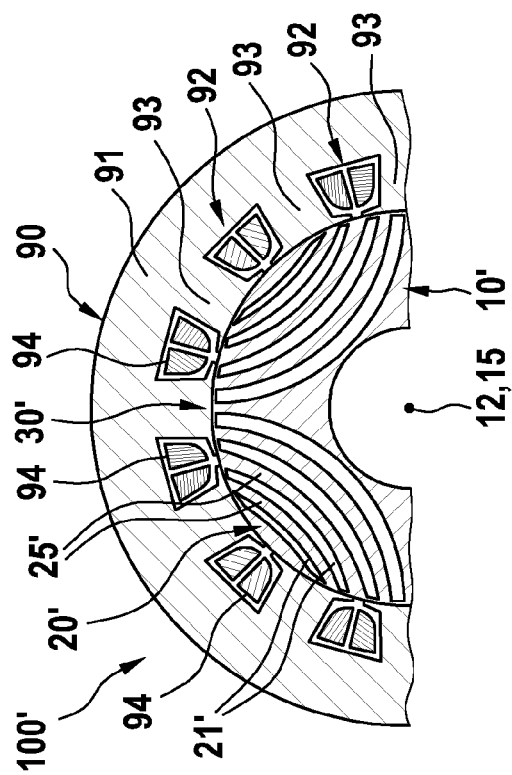

ROTOR, METHOD FOR PRODUCING A ROTOR, RELUCTANCE MACHINE, AND WORKING MACHINE

CROSS-REFERENCE TO RELATED APPLICATIONS

This application is a U.S. National Stage Application of International Application No. PCT/EP2017/065975 filed Jun. 28, 2017, which designates the United States of America, and claims priority to DE Application No. 10 2016 211 841.2 filed Jun. 30, 2016, the contents of which are hereby incorporated by reference in their entirety.

TECHNICAL FIELD

The present disclosure relates to rotating machinery. Various embodiments of the teachings herein may include a rotor, a method for producing a rotor, a reluctance machine, and/or a working machine.

BACKGROUND

In the region of electrical working machines, so-called reluctance machines are frequently used as three-phase machines. They are composed of a stator which is usually located on the outside and has a coil arrangement, and a rotor which is surrounded by the stator, is rotatably mounted in the interior of the latter and has a sequence of poles and gaps which are formed in accordance with an alternating sequence of barrier regions with magnetic flux regions and pole regions for the magnetic flux to exit through.

Owing to the construction of the stator and rotor and, in particular, because of the discrete design of the sequence of poles and gaps in the rotor, on the one hand, and the external toothing of the magnetic-field-transmitting windings, on the other, during operation the torque which can be extracted comes to be dependent on the angular position of the rotor with respect to the stator. This gives rise to a ripple in the profile of the torque plotted against the rotational angle, correspondingly in the movement over time.

SUMMARY

The teachings herein describe a rotor for a reluctance machine, a method for producing a rotor for a reluctance machine, a reluctance machine as such and a working machine and, in particular, a vehicle, in which the torque ripple is particularly small using particularly simple means. For example, some embodiments may include a rotor (10) for a reluctance machine (100), having: an essentially disc-shaped rotor body (11) around a rotor axis (12) running through a rotor center point (15), and an alternating sequence of barrier regions (20) and pole regions (30) in the circumferential direction of the rotor body (11), wherein each barrier region (20) has a multiplicity of magnetic flux barriers (21, 22) which are spatially and materially separated and do not overlap, characterized in that, within at least one barrier region (20), at least one magnetic flux barrier (21) is arranged with a q axis (13) and/or figure axis (13) rotated with respect to a q axis (13, 14) and/or figure axis (13, 14) of another magnetic flux barrier (22, 21) of the same barrier region (20), about the rotor axis (12).

In some embodiments, a plurality of magnetic flux barriers (22) of the same barrier region (20) are arranged with their q axes (13) and/or figure axes (13) rotated with respect to a q axis (13, 14) and/or figure axis (13, 14) of another magnetic flux barrier (22, 21) of the same barrier region (20), about the rotor axis (12), wherein the rotational angles have the same value or different values, and/or the direction of rotation is the same or different.

In some embodiments, one or more magnetic flux barriers (22, 21) of different barrier regions (20) are arranged with their q axes (13) and/or figure axes (13) rotated with respect to a q axis (13, 14) and/or figure axis (13, 14) of another magnetic flux barrier (22, 21) of a respective same barrier region (20), about the rotor axis (12), wherein the rotational angles have the same value or different values and/or the direction of rotation is the same or different, to be precise respectively compared with corresponding rotational angles or directions of rotation of one or more other barrier regions (20).

In some embodiments, there is an even number of barrier regions (20).

In some embodiments, with the exception of a rotation about the rotor axis (12), different barrier regions (20) are identical to one another or are mirror-symmetrical with respect to an axis, in particular with respect to q axes or figure axes, which are moved into congruence, of the barrier regions (20).

In some embodiments, a magnetic flux barrier (21, 22) of a barrier region (20) is of mirror-symmetrical or asymmetrical design with respect to its q axis (13, 14) and/or figure axis (13, 14).

In some embodiments, rotational angles and/or directions of rotation of q axes (13) and/or figure axes (13) of one or more magnetic flux barriers (21, 22) with respect to q axes (13, 14) and/or figure axes (13, 14) of other magnetic flux barriers (21, 22) of the same barrier region (20) are selected in such way that during the operation of the rotor (10) a reduced and, in particular, minimum torque ripple occurs in comparison with a rotor (10') with a configuration without rotation of magnetic flux barriers (20').

As another example, some embodiments include a method for producing a rotor (10) as described above, in which rotational angles and/or directions of rotation of q axes (13) and/or figure axes (13) of one or more magnetic flux barriers (21, 22) with respect to q axes (13, 14) and/or figure axes (13, 14) of other magnetic flux barriers (21, 22) of the same barrier region (20) are selected in such way that during operation of the rotor (10) a reduced and, in particular, minimum torque ripple occurs in comparison with a rotor (10') with a configuration without rotation of magnetic flux barriers (20').

As another example, some embodiments include a reluctance machine (100), having: a stator (90) for generating a primary magnetic field and/or for inducing a secondary magnetic field, and at least one rotor (10) as claimed in one of claims 1 to 7, which rotor (10) is mounted so as to be rotatable with respect to the rotation about the rotor axis (12), and is surrounded by the stator (90), or surrounds such a stator (90), for the purpose of magnetic interaction.

In some embodiments, the stator (90) is embodied with a concentrated winding.

In some embodiments, the reluctance machine is embodied as a motor and/or as a generator or as part of a motor and/or generator.

As another example, some embodiments include a working machine, which has a reluctance machine (100) as described above, as a motor and/or as a generator or as part of a motor and/or generator in a drive or assembly, and which is embodied, in particular, as a vehicle.

BRIEF DESCRIPTION OF THE DRAWINGS

Further details, advantages and features of teachings in the present disclosure can be found in the following description of exemplary models with reference to the drawings.

FIGS. 5 to 10 demonstrate, by means of cross-sectional illustrations and in the form of graphs of simulation results, advantages which can be achieved with the reluctance machine incorporating teachings of the present disclosure using embodiments of the rotor incorporating teachings of the present disclosure;

Figure 1:
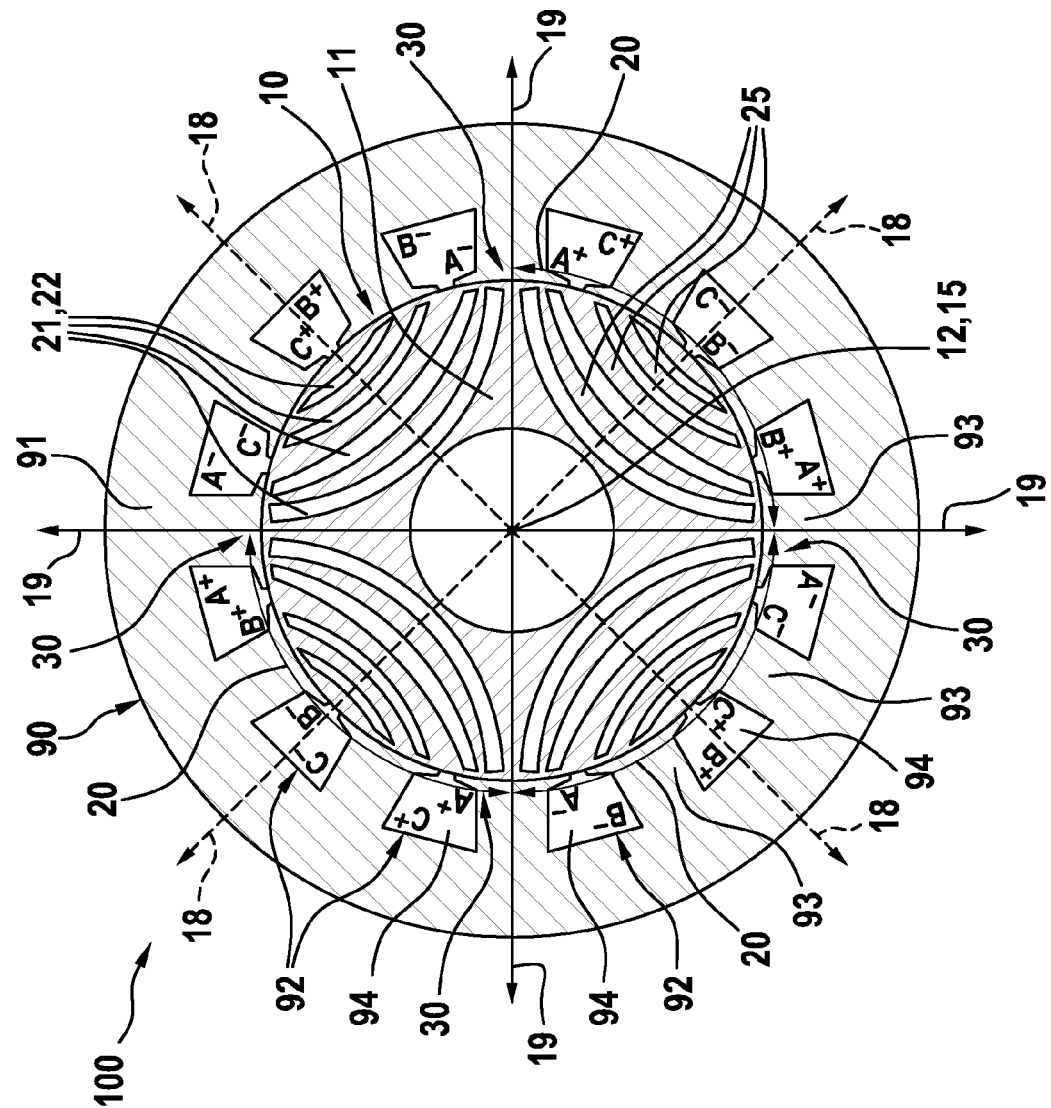
FIG. 1 is a cross-sectional view showing an embodiment of the reluctance machine incorporating teachings of the present disclosure using a rotor incorporating teachings of the present disclosure, wherein the cross-section is perpendicular with respect to the rotational axis.

Various embodiments are described in detail below with reference to FIGS. 1 to 14. Identical and equivalent as well as identically or equivalent acting elements and components are denoted by the same reference symbol. The description of details of the denoted elements and components are not represented for every case of their occurrence.

DETAILED DESCRIPTION

In some embodiments, a rotor for a reluctance machine comprises an essentially disc-shaped rotor body around a rotor axis running through a rotor center point, and an alternating sequence of barrier regions and pole regions in the circumferential direction of the rotor body, wherein each barrier region has a multiplicity of magnetic flux barriers which are spatially and materially separated and do not overlap, and wherein, within at least one barrier region, at least one magnetic flux barrier is arranged with a q axis and/or figure axis or axis of symmetry rotated with respect to a q axis and/or figure axis or axis of symmetry of another magnetic flux barrier of the same barrier region, about the rotor axis or the rotor center point. The arrangement of the individual magnetic flux barriers within a given barrier region of the rotor with q axes and/or figure axes which are rotated in relation to one another, with respect to the rotor axis or the center point of the rotor body which serves as a basis.

The rotation of one or more magnetic flux barriers within one or more barrier regions of the rotor selectively brings about an asymmetry of the field profile of the magnetic field in the rotor and therefore an asymmetry of the reluctance and of the reluctance force which acts on the rotor when an external magnetic alternating field is applied. This intentionally selected asymmetry interacts, during the operation of a reluctance machine which is equipped with such a rotor, with the discreet structure of the external stator and the winding thereof, in such a way that as it were a multiplicity of torque ripples which are phase-shifted with respect to one another is produced, said torque ripples resulting, in their total and super position, in an overall torque ripple, of the reluctance machine which is equipped with a rotor incorporating teachings of the present disclosure, which has an overall reduction in its amplitude.

In some embodiments, the webs, that is to say the flux-carrying and/or flux-conducting regions between the individual magnetic flux barriers, extend essentially in the circumferential direction in the rotor and are spaced apart from one another essentially in the radial direction, and are arranged with their q axes and/or figure axes rotated in relation to one another with respect to the rotor axis and the rotor center point. The two possibilities of rotating the magnetic flux barriers as such or the magnetic flux webs can be combined with one another. A q axis is understood to be an axis which is perpendicular to the rotor axis and which is located between d axes of the rotor, and consequently between poles as the regions where the flux lines of the rotor occur.

In conventional rotors, the q axis of a barrier region overall and the q axes of the individual magnetic flux barriers of the barrier region correspond and are identical to the figure axes or axes of symmetry of the individual barrier regions and of the individual magnetic flux regions.

In some embodiments, a rotation of individual q axes and/or figure axes, or of a plurality thereof, of individual magnetic flux barriers within one barrier region take place in relation to one another, wherein the rotation takes place about the rotor axis of the rotor body which serves as a basis, and therefore generally about the center point of the rotor body, when viewed in section.

In some embodiments, an additional decrease in the torque ripple of the rotor is achieved by virtue of the fact that a plurality of magnetic flux barriers of the same barrier region are arranged with their q axes and/or figure axes rotated with respect to a q axis and/or figure axis of another magnetic flux barrier of the same barrier region, about the rotor axis. In this context, the rotational angles have the same value or different values, and/or the direction of rotation can be the same or different. A further increase in the reduction in the torque ripple occurs when, corresponding rotations of the arrangement of the individual magnetic flux barriers take place in a plurality of different barrier regions.

In some embodiments, one or more magnetic flux barriers of different barrier regions are arranged with their q axes and/or figure axes rotated with respect to a q axis and/or figure axis of another magnetic flux barrier of a respective same barrier region, about the rotor axis. In this context, the rotational angles can have the same value or different values and/or the direction of rotation can be the same or different, to be precise respectively compared with corresponding rotational angles or directions of rotation of one or more other barrier regions.

In some embodiments, an even number of barrier regions is embodied. Correspondingly, an even number of poles is then also present.

Particularly simple production conditions occur during the production of the rotor according to the invention if—despite the intentional stamping on the magnetic flux asymmetry—different barrier regions in their entirety, with the exception of a rotation about the rotor axis with respect to one another, are identical and/or mirror-symmetrical with respect to an axis, in particular with respect to q axes or figure axes or axes of symmetry which are moved into congruence, of the barrier regions in their entirety.

In some embodiments, the rotor or can be simplified with an unchanged reduction in the torque ripple if a magnetic flux barrier of a barrier region is constructed in a mirror-symmetrical fashion with respect to the q axis and/or figure axis of said magnetic flux barrier. In some embodiments, an asymmetrical design with respect to a q axis is conceivable, in order, as a result, to lower the torque ripple further. A particularly high degree of synchronism in terms of the reduction of the torque ripple occurs when the rotational angles and/or the directions of rotation of the respective q axes and/or figure axes are matched to one another in terms of optimization.

In some embodiments, rotational angles and/or directions of rotation of q axes and/or figure axes with respect to q axes and/or figure axes of other magnetic flux barriers are selected in such way that during the operation of the rotor a reduced and, in particular, minimum torque ripple occurs in comparison with a rotor with a configuration without rotation of magnetic flux barriers.

In some embodiments, a method for producing a rotor having a structure described above, includes rotational angles and/or directions of rotation of q axes and/or figure axes with respect to q axes and/or figure axes of other magnetic flux barriers are selected in such way that during the operation of the rotor a reduced and, in particular, minimum torque ripple occurs in comparison with a rotor with a configuration without rotation of magnetic flux barriers. In some embodiments, a reluctance machine includes a stator for generating a primary magnetic field and/or for inducing a secondary magnetic field and with a rotor as described above. In some embodiments, a rotor as described above is mounted rotatably in the reluctance machine in order to rotate about the rotor axis, and is surrounded by the stator for the purpose of magnetic interaction.

In some embodiments, the reluctance machine can be embodied as an external rotor machine and can surround it in its interior having the stator. In some embodiments, the reluctance machine can be embodied with any desired winding topology and nevertheless exhibits all the advantages which reluctance machines offer as three-phase machines. In particular, it is possible, when using the rotor, also to use a stator with a concentrated winding.

Usually, when concentrated windings are used, machine topologies with a small number of teeth and grooves for each pole are brought about. With relatively small numbers of teeth and grooves for each pole the torque ripple becomes larger because, as a result, the groove harmonics of the magnetic field in the air gap of the machine increase. The groove harmonics play a decisive role in the torque ripple. Common methods do not have sufficient degrees of freedom in order to reduce the ripple which is increased by the type of winding, to such an extent that beneficial use would be conceivable.

The reluctance machine incorporating the teachings herein can be embodied and used as a motor and/or as a generator or as part of a motor and/or generator. In some embodiments, a working machine incla reluctance machine incorporating teachings of the present disclosure as a motor and/or generator or as part of a motor and/or generator. The working machine can be embodied, in particular, as a vehicle, wherein the reluctance machine which is used can then be part of a locomotion drive or of some other assembly.

The illustrated features and further properties can be isolated in any desired form from one another and combined with one another as desired without departing from the core of the teachings herein.

FIG. 1 shows a cross-sectional view, perpendicularly to the rotational axis, of a reluctance machine 100 with a stator 90 which is arranged on the outside and has stator bodies 91 and stator coils 92. In the interior of the stator 90, a rotor 10 with a rotor body 11 is arranged in a rotationally movable fashion with respect to the rotation about the rotor axis 12. In the cross-sectional view according to FIG. 1, the rotor center point 15, which can also be referred to as the center point M of the rotor 10, is defined by the rotor axis 12. In the embodiment illustrated in FIG. 1, the stator 12 has coils, and is embodied here with 12 teeth and with 12 grooves as well as 4 poles. It is therefore a 12/4 reluctance machine.

The internally arranged rotor 10 has, in the embodiment according to FIG. 1, four pole regions 30 for the exiting of the magnetic flux, wherein the pole regions 30 have an angular spacing of 90° with respect to one another. As result of the structuring of the rotor body 11, barrier regions 20 with a multiplicity of magnetic flux barriers 21 and 22 are embodied between the pole regions 30. Magnetic flux webs 25 are embodied between the respective magnetic flux barriers 21 and 22. In the structure illustrated in FIG. 1, the magnetic resistance, also referred to as reluctance, is comparatively large perpendicularly to the direction of the profile of the magnetic flux webs 25, and therefore also essentially perpendicularly to the profile of the magnetic flux barriers 21, 22, while in the direction of the profile of the magnetic flux webs 25 it is comparatively small, with the result that during operation the magnetic flux is guided parallel to the magnetic flux webs 25 and in the direction of the pole regions 30, and exits there.

The center of the emergence of the magnetic flux in the pole region 30 defines what is referred to as the d axis 19 (from the English d: "direct") of the rotor 10, in each case in relation to the rotor center point 15. In each case what is referred to as a magnetic gap occurs between two d axes 19 or pole regions 30 which are directly adjacent to one another in the circumferential direction, said magnetic gap being defined by the respective barrier region in the center of which a q axis 18 (from the English q: "quadrature") of the rotor 10 is defined, in which q axis of the magnetic flux does not exit the rotor 10.

In the abutment according to FIG. 1, the individual magnetic flux barriers 21 and 22 are embodied as such symmetrically with respect to their own q axes 13, 14, but rotated by specific angles in relation to one another with respect to the rotor axis 12 and the rotor center point 15. With respect to the rotor axis 12, barrier regions 20, directly opposite one another, of the rotor 10 from FIG. 1 are embodied and arranged point-symmetrically in relation to one another with respect to the center point 15 of the rotor 10.

In FIG. 1, the rotor axis 12 is parallel to the z direction, and the sectional plane is parallel to the xy plane. In order to explain the core aspects of the present disclosure, specifically the rotation of individual magnetic flux barriers in relation to one another with respect to the rotor center point 15 within the same barrier region 20, reference is made to the simplified illustration according to FIG. 2. The latter shows, in a schematic and sectional view with a sectional plane perpendicular to the rotor axis 12, an embodiment of the inventive rotor 10 with a rotor body 11 and two barrier regions 20, each with two magnetic flux barriers 21 and 22, respectively.

The rotor axis 12 is again parallel to the z direction, and the sectional plane is parallel to the xy plane. For the sake of clearer illustration, the magnetic field barriers 21 and 22 are denoted by the symbols B1 and B4. The magnetic field barriers 21, 22 of the rotor 10 from FIG. 2 are all embodied symmetrically in themselves, specifically in relation to their respective q axis 13 and 14, respectively, which are themselves correspondingly denoted by q1 to q4.

Figure 2:
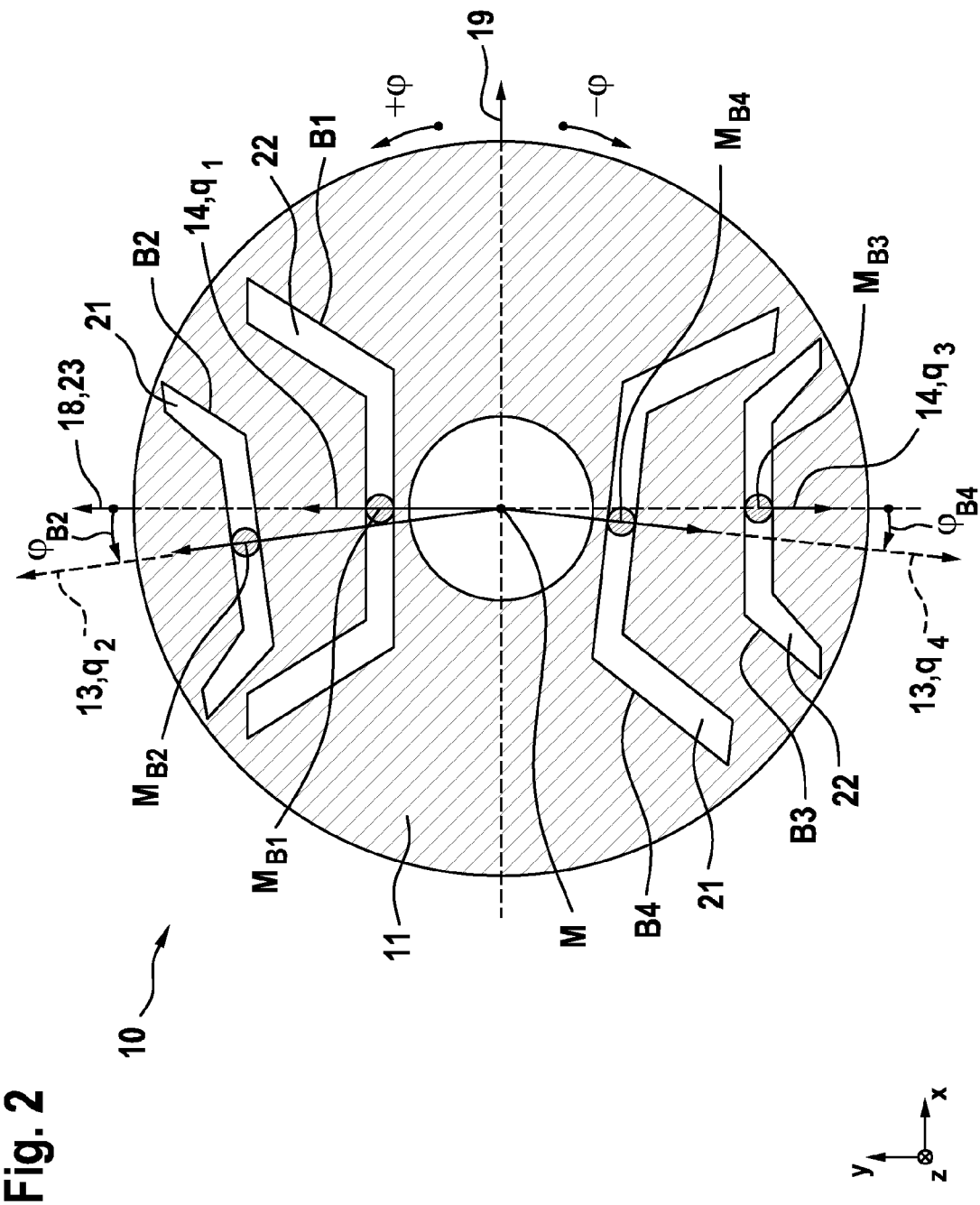
FIG. 2 shows a cross-sectional view of an embodiment of the rotor incorporating teachings of the present disclosure.

In the embodiment illustrated in FIG. 2, the magnetic flux barriers B1 and B3 are not rotated magnetic flux barriers 21, that is to say their q axes 14 and q1 and q3, respectively, correspond directly to the q axis 18 of the rotor 10. In contrast, the magnetic flux barriers B2 and B4 are embodied as rotated magnetic flux barriers 22, with the result that their q axes 13 and q2 and q4 are rotated with respect to the q axis 18 of the rotor 10, about a rotational angle φB2 or φB4 in a positive or negative rotational direction about the rotor axis 12.

In FIG. 2, each of the magnetic flux barriers B1 to B4 therefore has its respective own q axis q1 to q4 as a rotated magnetic flux barrier 21 or as a non-rotated magnetic barrier 22. The respective barriers B1 to B4 are embodied symmetrically about these axes q1 to q4, as a rotated magnetic flux barrier 22 or as a non-rotated magnetic flux barrier 21. However, this is not compulsory, it is instead also possible to use asymmetrical magnetic flux barriers, this is to say ones which are not symmetrical in relation to their respective q axis.

Figure 3:
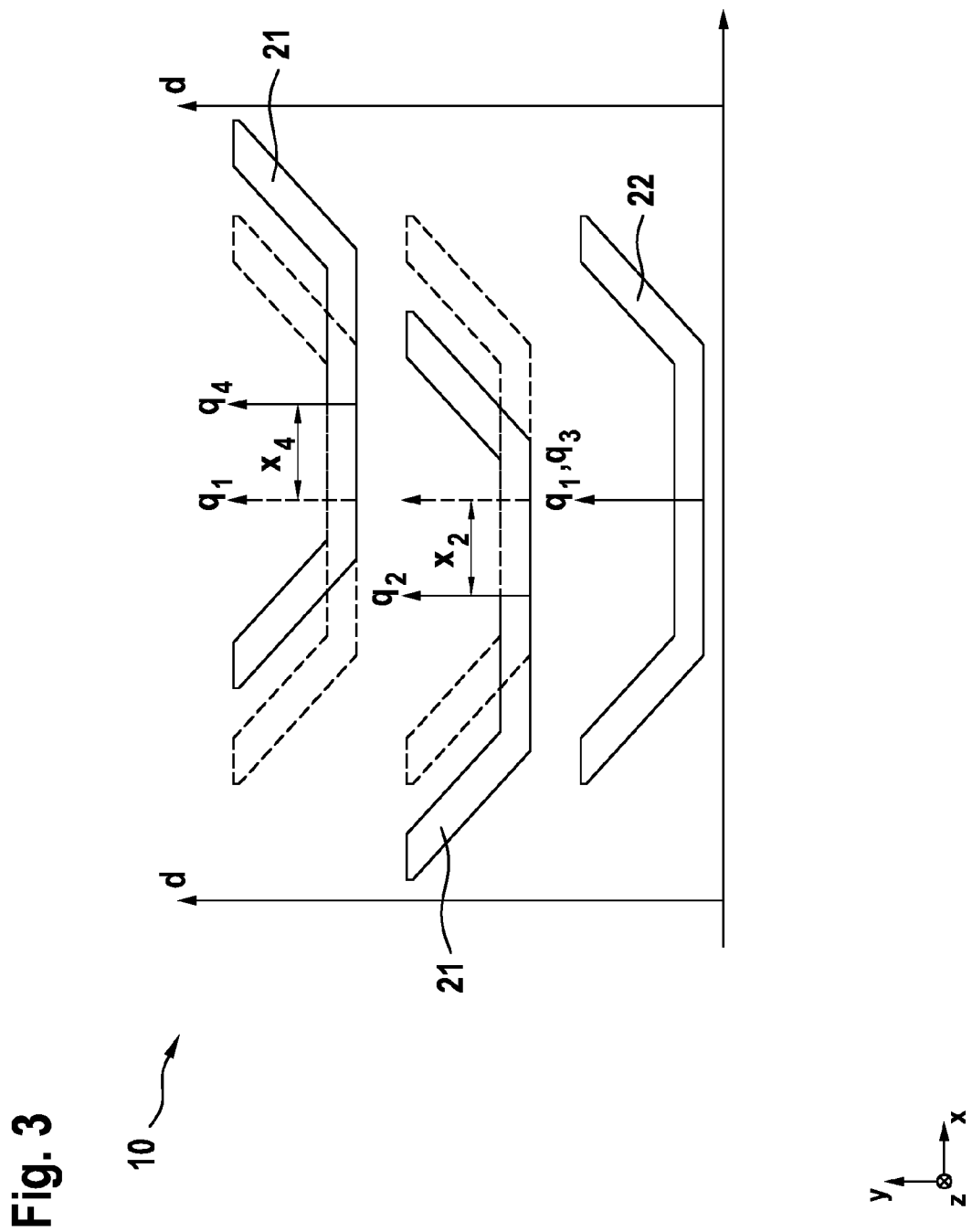
FIG. 3 clarifies the position of the q axes of the magnetic flux barriers relative to one another by means of a schematic and developed view of one embodiment of the rotor incorporating teachings of the present disclosure.

FIG. 3 shows a schematic view of details of the rotation of q axes q2 and q4 as q axes of rotated magnetic flux barriers 22 in a developed illustration. In this developed illustration, the rotations about the angles φB2 and φB4 result in displacements x2, x4 in the circumferential direction (parallel to the abscissa in the illustration there), this is to say perpendicular per connecting line between adjacent d axes.

Figure 4:
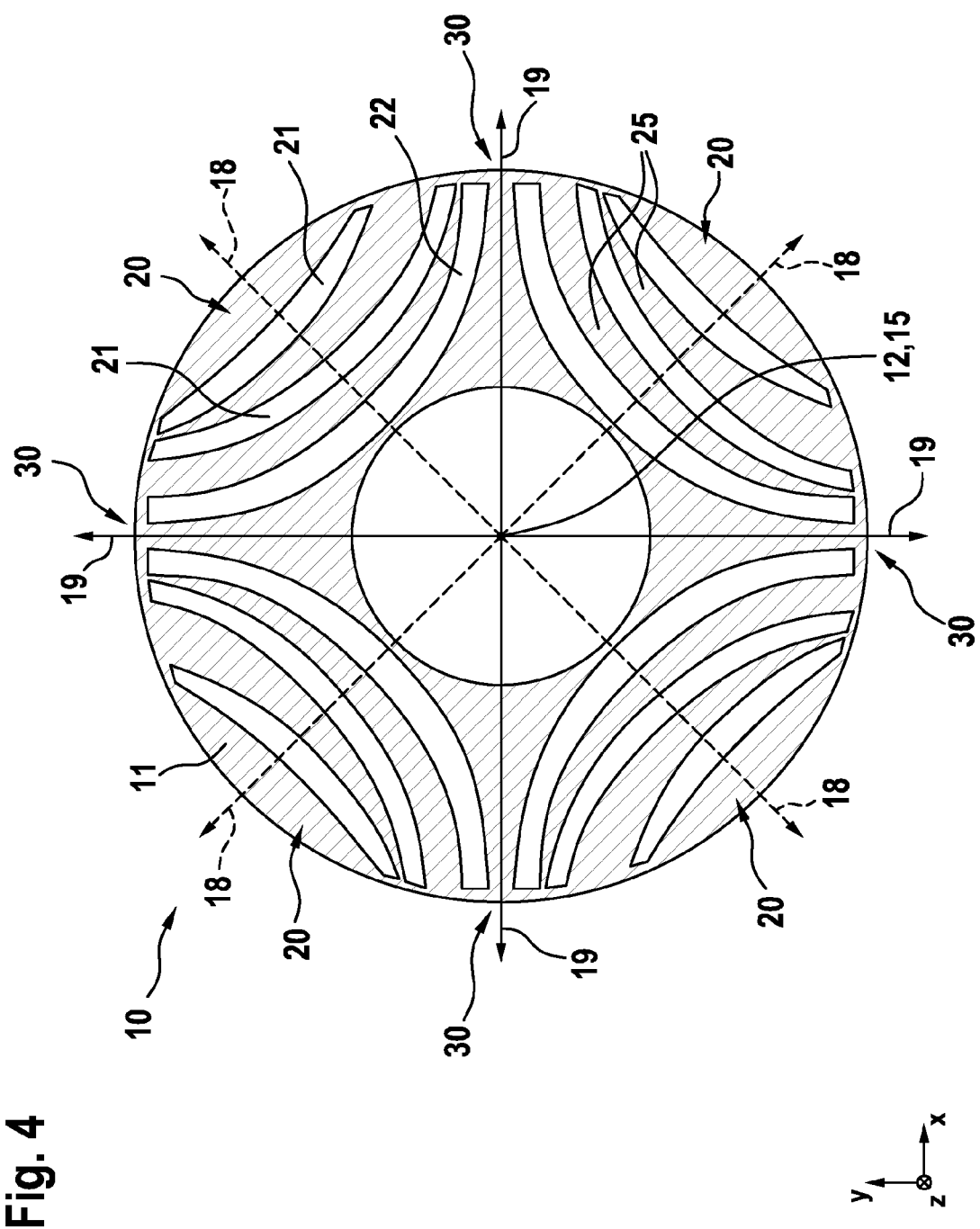
FIG. 4 shows another embodiment of a rotor incorporating teachings of the present disclosure by means of a schematic cross-sectional view.

FIG. 4 shows another embodiment of a rotor 10 according to the invention, using four barrier regions 20 with three magnetic flux barriers 21 each. In this embodiment, the magnetic flux barriers 21 are each rotated differently with respect to one another within a respective barrier region 20 and are also each rotated differently with respect one another in relation to the other barrier regions 20, with the result that a type of maximum variation occurs here.

Figure 7:
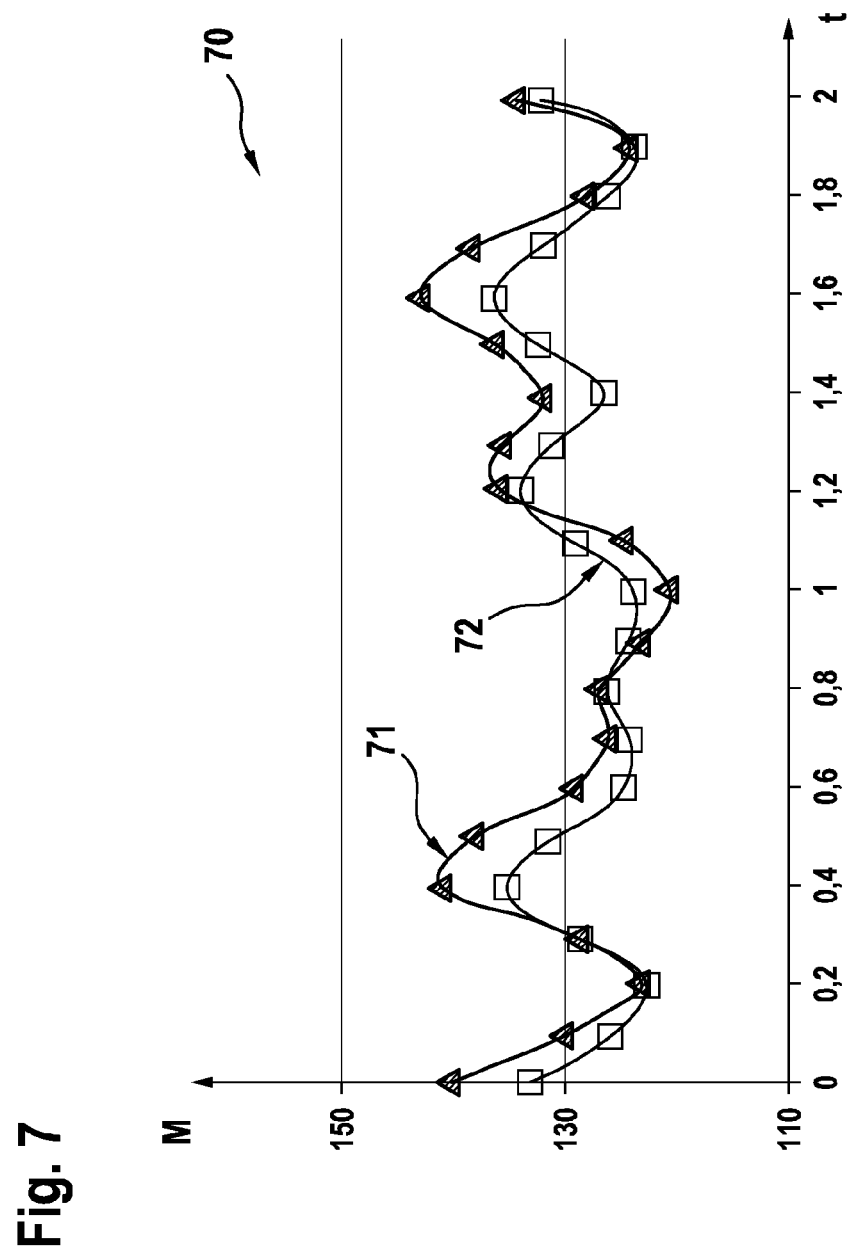
Figure 8:
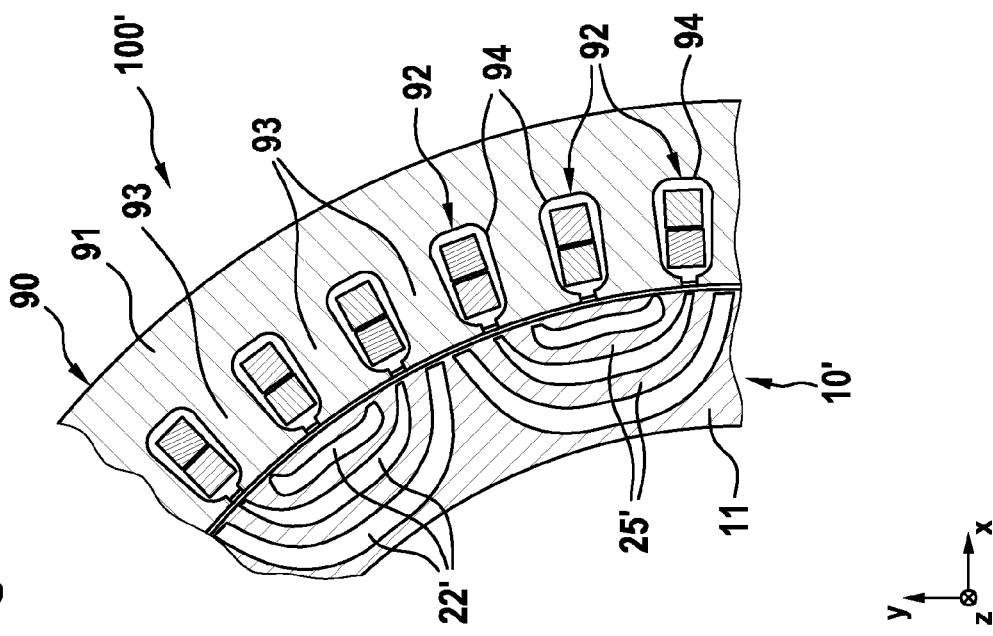

FIGS. 5 to 10 show, by means of schematic cross-sectional views and graphs of simulation data, the advantages which can be achieved according to the invention in comparison with the results when using conventional reluctance machines 100'. In the illustrations in FIGS. 5 to 10, parts of cross-sectional views of conventional reluctance machines 100' are illustrated in FIGS. 5 and 8.

In these illustrations, various coils 92 for generating a, here three-phase, magnetic field, are embodied on the inner side of the stator 90 with the stator body 91 in an alternating sequence. In the interior of the stator 90 there is a conventional rotor 10' with a sequence of conventional barrier regions 20' with conventionally embodied, therefore symmetrical and non-rotated magnetic flux barriers 22' and magnetic flux webs 25' provided between them. This gives rise, in the graph 70 illustrated in FIG. 9, to the data of the trace 71 with the data points symbolized by triangles. The trace 71 represents the torque ripple as a fluctuation of the torque M which is plotted on the ordinate, as a function of the chronological profile, plotted on the abscissa, with the time t.

In contrast, FIG. 6 shows a schematic detail of an embodiment of the reluctance machine 100 according to the invention with a corresponding stator 90 from FIG. 5, but with a rotor 10 which is configured according to the invention and has magnetic flux barriers 21 which are embodied rotated with respect one another in each barrier region 20, wherein the signs of the directions of rotation are respectively reversed with respect to two barrier regions 20 which directly follow one another in the circumferential direction.

With the arrangement illustrated in FIG. 6, the trace of simulation values, denoted by 72, is obtained in the graph 70 when evaluating the torque ripple with data points which are symbolized by squares.

The illustrations in FIGS. 5 to 7 are synchronous reluctance machines with a stator 90 with twelve teeth 93 and twelve grooves 94, each of which a coil 92 is accommodated, with the result that twelve coils 92 are present, and a rotor 10', 10 with four pole regions 30. In the arrangement according to the invention in FIG. 6, as a final result a torque ripple with a reduction by 38% with respect to the conventional arrangement in FIG. 5 is obtained, wherein the torque is lowered by only 2%.

Figure 9:
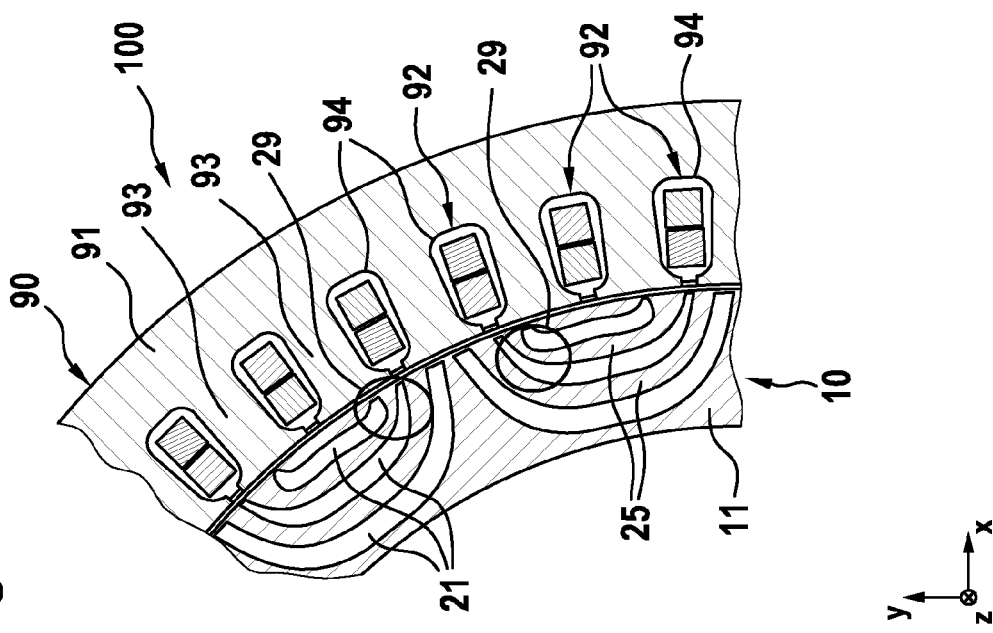
Figure 10:
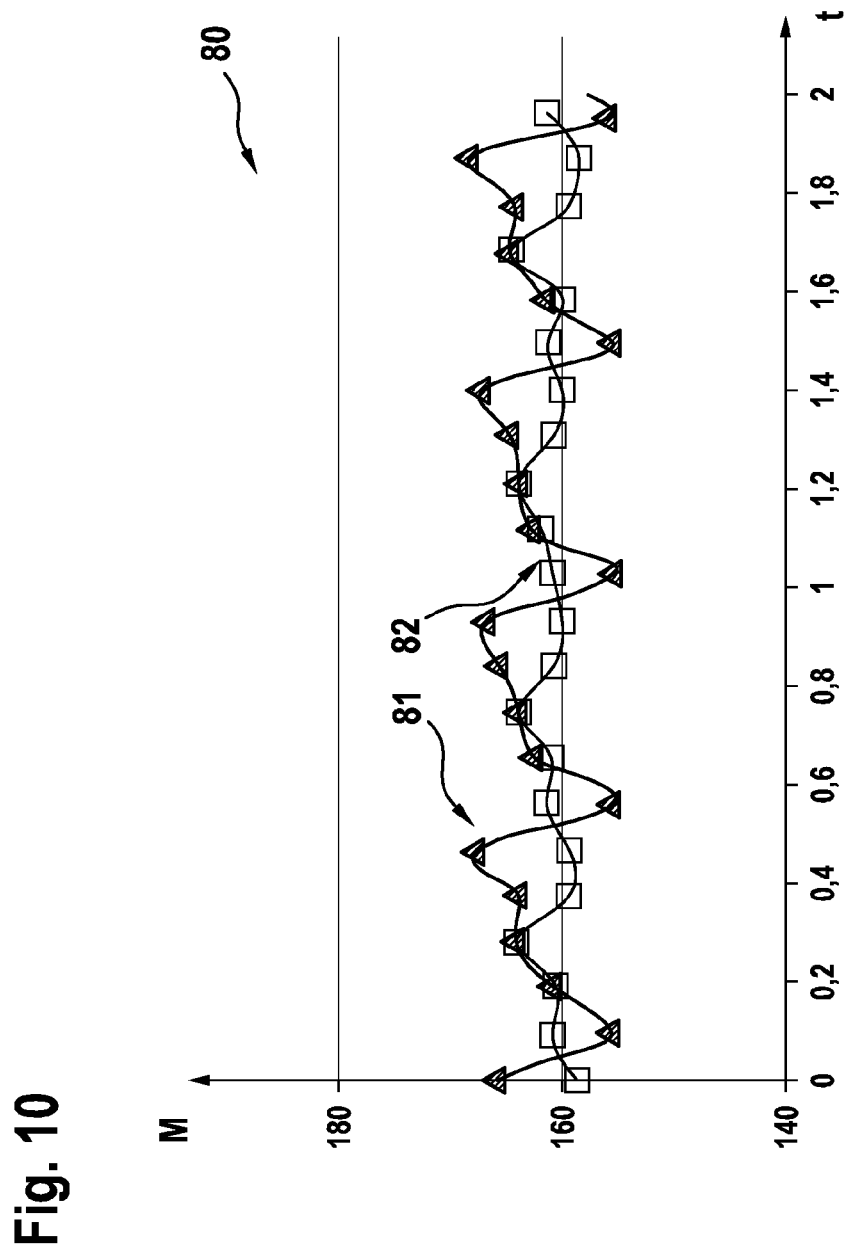

FIGS. 8 to 10 show the application of the new configurations for a rotor 10 for a reluctance machine 100 with a configuration with 42 teeth 93 and grooves 94 in the stator 90 and 14 poles in the rotor 10', 10, wherein each barrier region 20 has three magnetic field barriers 21. In FIG. 8, the conventional rotor 10' with conventional magnetic flux barriers 22' which are not rotated with respect one another is illustrated. In the case of an identical rotational angle FIG. 9 shows, in contrast, a rotor 10 according to the invention in which the magnetic flux barriers 21 are rotated with respect to one another, wherein the direction of rotation of corresponding magnetic flux barriers 21 in the circumferential direction of directly adjacent barrier regions 20 is respectively reversed in the case of an identical rotational angle.

In FIG. 10, graph 80 illustrates the result of the acquisition of the torque ripple in the conventional reluctance machine 100' according to FIG. 8 in the trace 81, specifically with the data points symbolized by triangles. The trace 82 of the graph 80 from FIG. 10 shows, with the data points symbolized by squares, the acquired torque ripple of the reluctance machine 100, configured according to the invention, from FIG. 9. A reduction of the torque ripple by 54% is obtained, wherein the torque is decreased overall by only 1%.

Figure 11:
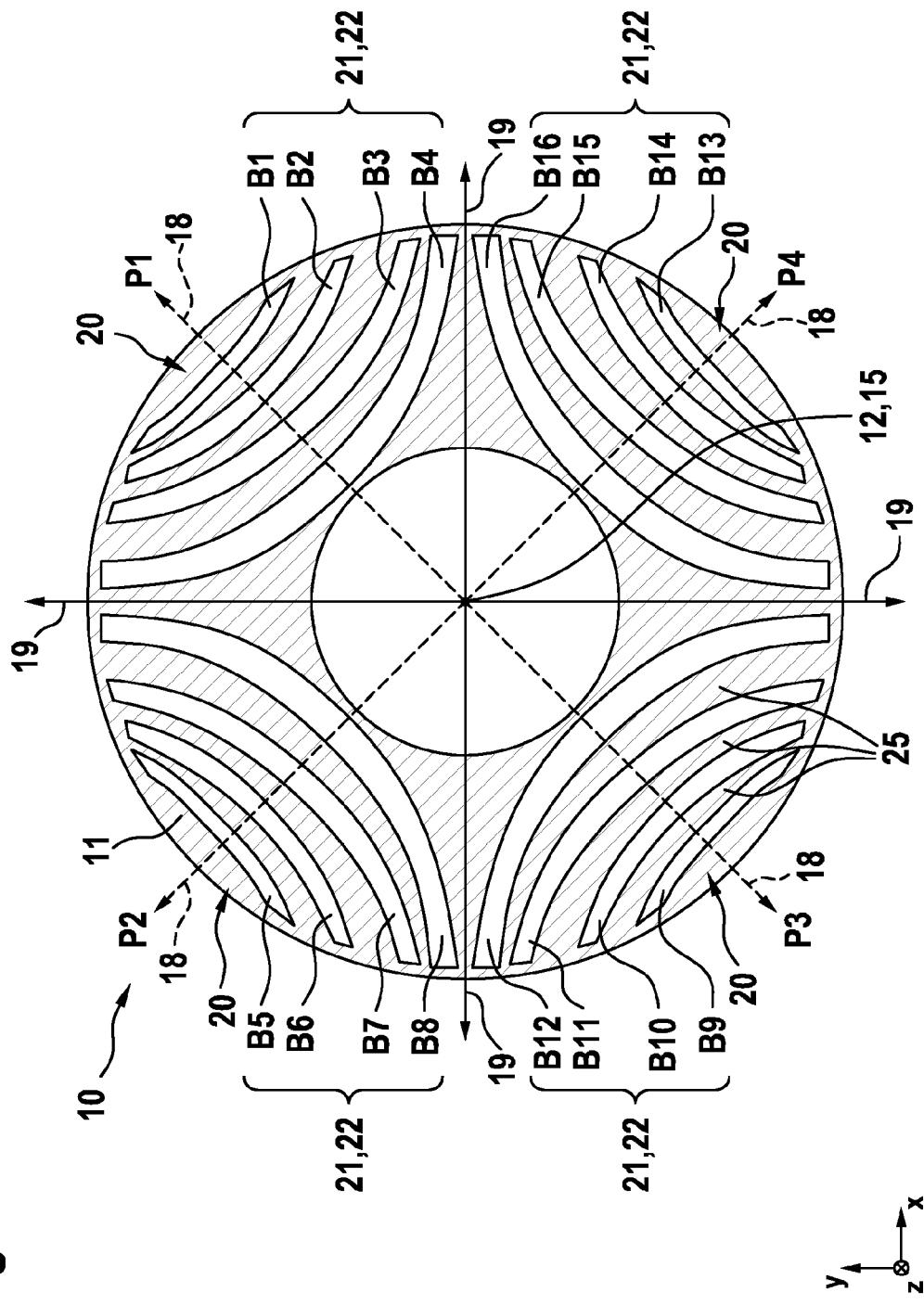
FIG. 11 shows a schematic cross-sectional view of another embodiment of the rotor incorporating teachings of the present disclosure, clarifying a method for configuring the magnetic flux barriers.

FIG. 11 shows the arrangement, used in conjunction with figures and 7, for a rotor 10 according to the invention, and illustrates, in particular, the procedure for the optimum embodiment of the arrangement of the individual rotated magnetic flux barriers 21 in relation to one another within a respective barrier region 20 but also in relation to barrier regions 20, adjacent to one another, of the rotor 10.

These and further features and properties of the present invention are explained further by means of the following statements:

The teachings herein may be applied to electric machines, in particular the synchronous reluctance machine. On the one hand, synchronous reluctance machines (SynRM) are already used today as pump motors and fan motors (ABB, KSB) and could be appropriate applications of SynRM in wind turbines and in electric mobility. In comparison with other three-phase machines (synchronous machines and asynchronous machines), SynRMs have a simpler design and are more robust and cost-effective. However, until now these advantages were obtained at the cost of increased torque ripple.

In general, the torque ripple of an SynRM should be small as possible. The efforts to reduce the torque ripple had previously resulted in significant reductions in terms of the average torque which can be tapped at the machine. Furthermore, in this context the advantage of a simpler design of the machine is overridden by a conventionally complicated rotor.

Conventional SynRMs have to be given a sloping design owing to the excessively high torque ripple. This is costly in terms of production technology and therefore expensive. The teachings of the present disclosure may significantly lower the torque ripple of reluctance machines and, in particular, of SynRMs without in the process markedly reducing the average torque and without giving up the advantage of simple fabrication of SynRMs. According to FEM models, it is possible under certain circumstances even to dispense with the sloping of the rotor and/or stator, with the result that the publication of the SynRM can be even more favorable. In this context, individual flux barriers of each rotor pole are rotated about the center point of the rotor, that is to say the z axis.

A reduction in the torque ripple is obtained without significant reductions of torque, applicability to all SynRM topologies, to be precise independently of the winding, number of coils, number of poles, number of teeth, shape of barriers, the possibility of avoiding sloping of the rotor and/or of the stator.

Some embodiments, then, displace q axes of individual flux barriers with respect one another within a rotor pole, and therefore to achieve asymmetry with respect to the originally common q axis, as is shown in FIG. 3 in conjunction with axis q1.

FIG. 3 shows part of a developed view of a rotor pole of an SynRM 100 incorporating teachings of the present disclosure. Three magnetic flux barriers 21, 22 are embodied. Taking as a basis a conventional rotor 10' whose conventional magnetic flux barriers 22' have symmetry about the common axis q1 within a rotor pole, the magnetic flux barriers 21 according to the invention rotated with respect to one another about the rotor center point 15—displaced in the developed illustration in FIG. 3—in such a way that they each give rise to a separate axis of symmetry qn with an index n, wherein the index n denotes the number of magnetic flux barriers 21, 22 per barrier region 20.

The following is to be noted:
(1) The n-te magnetic flux barrier 21 is rotated about the center point 15 of the rotor 10 by an angle—denoted by xn in FIG. 3—(no linear movement).
(2) Basically the direction of rotation of the magnetic flux barriers 21 can be freely selected. An alternating sign for the rotational direction as in FIG. 3 can be advantageous.
(3) Not all the magnetic flux barriers 21, 22 have to be rotated or in a rotated state.
(4) The shape of the barriers can be varied; polygonal, round or mixed shapes can be used, symmetrically or asymmetrically in relation to the respective axis qn.
(5) The rotational angle should be selected in the technically appropriate range, and the magnetic flux barriers 21, 22 should not intersect or overlap.
(6) The design can be applied to all SynRMs.
(7) The invention can also be applied to external rotor machines in which the stator is located on the inside and is surrounded or enclosed by the rotatable rotor.

The application of the method to 12/4- and 42/14-SynRMs is demonstrated in FIGS. 4 to 6 and 8 to 10, respectively. The two geometries are shown in order to ensure that the method can be advantageously used independently of the type of winding—concentrated or distributed—and independently of the number of pole pairs—small-number or high-number of poles.

The reference machines 100', in particular reference rotors 10' were not designed according to known instructions for the configuration of the rotor and were already found to be "relatively well configured".

12/4-SynRM

FIGS. 5 and 6 each show half the geometry of the 12/4-SynRM which is used. FIG. 5 describes the conventional reference machine 100' as a reference. FIG. 6 shows the reluctance machine 100 according to the invention. In said reluctance machine 100, the magnetic flux barriers 21 of the two barrier regions 20 which were depicted are displaced as rotor poles according to the principle described above, as is described by the marked details 29.

The corresponding torque profiles from FIG. 7 show that it was possible to lower the torque ripple by 38% with respect to the torque ripple of the reference machine 100'. At the same time, the average torque drops by only 2% compared to that of the reference machine 100' according to the invention.

In principle, any individual barrier region 20 could be used as a rotor pole for optimizing the torque ripple. In order to show the potential of the method and at the same time keep the optimisation period short, only two barrier regions 20 have been used in the present example. The torque ripple can be reduced further if all four barrier regions 20 of the rotor 10 are used.

42/14-SynRM:

FIGS. 8 and 9 show the seventh part of adjacent 42/14 topologies.

FIG. 8 shows a conventional rotor 10' as a reference. FIG. 9 shows the use of a rotor 10 which is embodied according to the invention and in which the magnetic flux barriers 21 are arranged rotated with respect to one another; this is apparent from the marked details 29.

A comparison of the torque profiles is illustrated again in FIG. 10. In this case, the torque ripple is reduced by 54%. The average torque is lowered by 1%.

In some embodiments, there is the possibility of improving the rotors 10 of a reluctance machine 100 with respect to the torque ripple, to be precise independently of the type of winding and the number of pole pairs of the machine. The significant torque reductions which are often caused by the reduction in the torque ripple do not occur here. The present method can be applied both to self-designed rotors as well as to known forms of rotor.

Efficient Application Optimization Method

The number and/or the arrangement of magnetic flux barriers 21, 22 which are to be rotated with respect to one another on a rotor 10, and the measuring and the orientation of the rotation can be selected in accordance with an optimisation method, in order to achieve a particularly small torque ripple with particularly small torque reductions.

This is explained in more detail below.

In this context, the following are provided an inventive 2p pole rotor 10 with N magnetic flux barriers 21, 22 per barrier region 20 or pole, according to FIG. 11 that is to say with 2p=4; N=4.

there are a total of 2p·N magnetic flux barriers 21, 22 and therefore 2p·N possible angles present for the optimization (2p·N degrees of freedom). In the example in FIG. 11, this makes 16 magnetic flux barriers 21, 22.

the magnetic flux barriers 21, 22 are also denoted by B1 to B16 in FIG. 11.

the 16 angles are denoted by $\varphi B1$ to $\varphi B16$.

this case, the optimization is carried out as follows:
(1) Poles located opposite barriers 21 and 22, e.g. P1 and P3 receive the same rotation angles. That is to say here:
$\varphi B1=\varphi B9$, $\varphi B2=\varphi B10$, $\varphi B3=\varphi B11$, $\varphi B4=\varphi B12$, $\varphi B5=\varphi B13$, $\varphi B6=\varphi B14$, $\varphi B7=\varphi B15$, $\varphi B8=\varphi B16$.

Only two directly adjacent poles (e.g.: P1 and P2) are optimized. That is to say, firstly P1 and P2 are optimized as described, and the optimisation then progresses in turn, e.g. with P3 and P4, P5 and P6 etc.

(2) The starting point of the optimization is the condition: All the angles are zero, i.e. φBj=0.
Step 1: Optimize pole P1, start at B1.
 Step 1.1: find optimum φB1.
 Step 1.2: Leave φB2=0.
 Step 1.3: find optimum φB3. If φB1>0 then φB3<0.
 Step 1.4: Leave φB4=0.
Step 2: Optimize pole P2, start at B6 (jump over B5).
 Step 2.1: Leave φB5=0.
 Step 2.2: find optimum φB6. If φB1>0, then φB6>0.
 Step 2.3: Leave φB7=0.
 Step 2.4: find optimum φB8. If φB6>0, then φB8<0.
(3) can be applied e.g. to an 12/4 machine:

| | | | |
|---|---|---|---|
| φB1 = +2.5° | φB2 = 0° | φB3 = −2.25° | φB4 = 0° |
| φB5 = 0° | φB6 = +1.75° | φB7 = 0° | φB8 = −0.5°. |

(4) This results in a torque M=128.5 Nm with 9.8% ripple.
(5) Finding an optimum value φBj means: The simulation carried out for a rotor 10 in which only the magnetic field barrier Bj is varied in the angle φBj and all the other barriers remain unchanged at angle 0. The angle φBj, at which the torque ripple is at a minimum constitutes the solution.
(6) If the sign for φBj is prescribed, only variations with the opposite sign for φBj+2 are permitted as a boundary condition. If angle φBj with a sign is found for the barrier Bj, the angle of rotation φBj+2 which is the barrier Bj+2 to be optimized next with an opposing sign—with respect to the sign of φBj—is to be searched for. That is to say the signs of φBj and φBj+2 are different. Excessively φBj rectified values of φBj+2 are ignored.
(7) A further optimisation can be achieved with increased expenditure: (a) The angles which are set to 0 or omitted can be varied and/or (b) the poles which are opposite one another no longer have to be configured identically.

Figure 12:
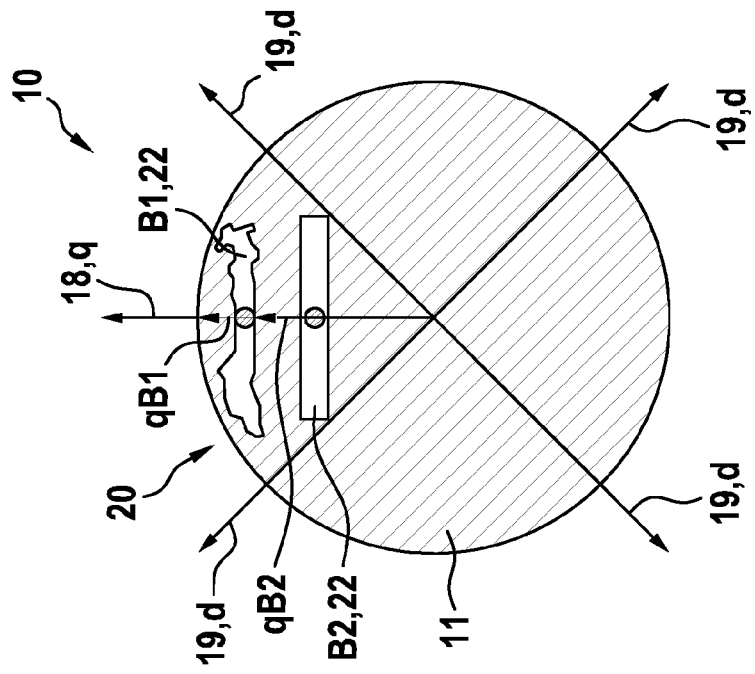
FIGS. 12 to 14 show schematic views explaining the term q axis in the case of an individual magnetic flux barrier.
Figure 13:
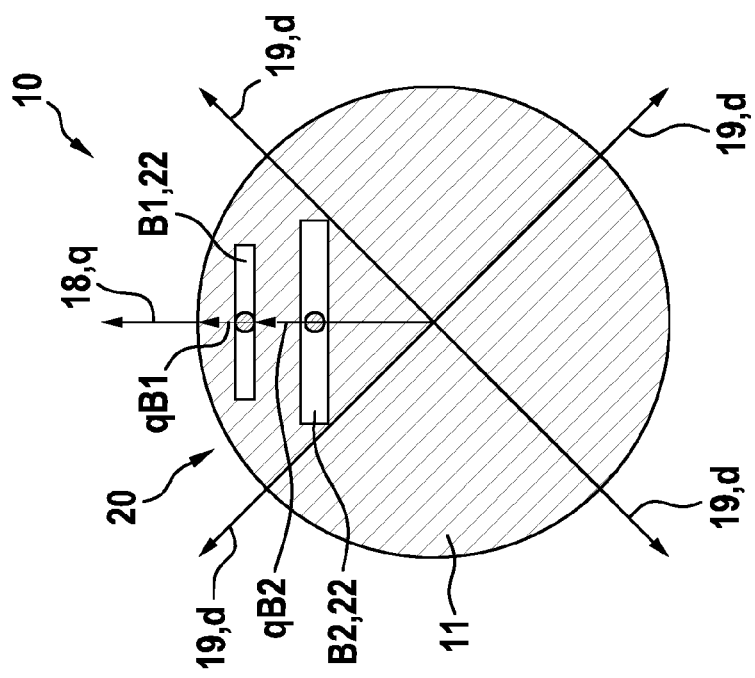
Figure 14:
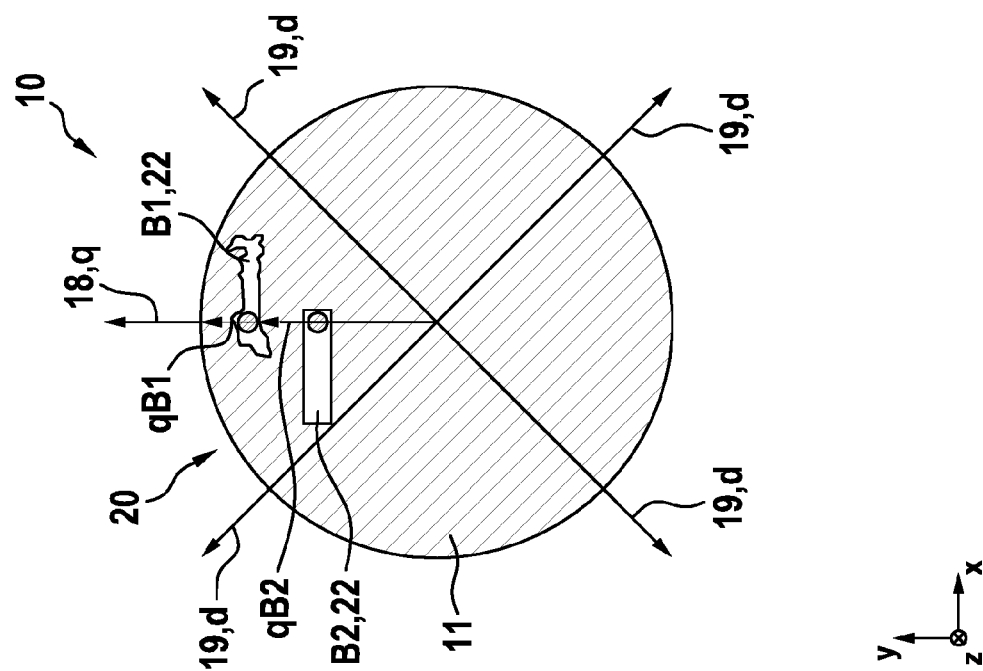

In addition to the written description above, for the sake of additional disclosure thereof, reference is made here explicitly to the figurative illustration of the invention in FIGS. 1 to 10. FIGS. 12 to 14 shows schematic views of rotors 10 in order to explain the term q axis in the case of an individual magnetic flux barrier 21, 22. These are denoted there again by B1 and B2, their q axes 13, 14 are correspondingly denoted by qB1, qB2.

In order to define the q axes of individual magnetic flux barriers B1, B2 it is to be noted that a q axis 18 of the rotor 10 is always located in its entirety between two d axes 19 of a rotor 10 in its entirety. In the case of magnetic flux barriers B1, B2 of the rotor which are inherently symmetrical, that is to say axis-symmetrical, it is the case that what are referred to as the q axes 13, 14 of the magnetic flux barriers B1, B2 as such, that is to say the axes qB1 and qB2 in FIG. 12, coincide with the q axis 18 of the entire rotor 10, that is to say are congruent with the q axis 18 of the entire rotor 10. In this context, the origin of these axes qB1, qB2 is located in each case at the center of gravity of the respective barrier B1 or B2.

In the case of magnetic flux barriers B1, B2 which are inherently asymmetrical, that is to say not axis-symmetrical, what are referred to as the q axes of the magnetic flux barriers B1, B2, that is to say the axes qB1 and qB2 in FIGS. 13 and 14, coincide with the q axis 18 of the entire rotor 10 are congruent with the q axis 18 of the entire rotor 10. However, owing to the asymmetry of the barriers B1, B2, the origin of these axes qB1, qB2 is no longer located at the center of gravity of the respective barrier B1, B2, but rather at the location where the center of gravity would be if there were symmetry with respect to the q axis 18 of the entire rotor 10.

Conclusions: The origin of the q axes qB1 and qB2 of the individual barriers B1, B2 is the only important factor. Even if the barriers B1, B2 are asymmetrical with respect to the q axis 18 of the rotor 10, the origin of the axes qB1 and qB2 of the magnetic field barriers B1, B2 is located where it would be in the case of symmetry.

The opposing rotation, provided according to the invention, within a given barrier region 20 is then defined as stated above on the basis of the q axes 13, 14 and qBj of the magnetic flux barriers 21, 22 and Bj which can be determined in this way.

LIST OF REFERENCE SIGNS

10 Rotor
10' Conventional rotor
11 Rotor body
12 Rotor axis
13 q axis, figure axis or axis of symmetry of a rotated magnetic flux barrier
14 q axis, figure axis or axis of symmetry of a non-rotated magnetic flux barrier
15 Center point of rotor
18 q axis of the rotor 10
19 d axis of the rotor 10
20 Barrier region
20' Conventional barrier region
21 Magnetic flux barrier, rotated
22 Magnetic flux barrier, not rotated
22' Conventional magnetic flux barrier
25 Magnetic flux web
25' Conventional magnetic flux web
29 Detail
30 Pole region
70 Graph
71 Trace simulation, conventional rotor
72 Trace simulation, rotor according to the invention
80 Graph
81 Trace simulation, conventional rotor
82 trace simulation, rotor according to the invention
90 Stator
91 Stator body
92 Coil
93 Tooth
94 Groove
100 Reluctance machine
100' Conventional reluctance machine
Bj Magnetic flux barrier where j=1, 2, . . . , 16, . . .
M Rotor center point
x Spatial direction
y Spatial direction
z Spatial direction
φBj Angle of rotation of the magnetic flux barrier Bj where j=1, 2, . . . , 16, . . .

What is claimed is:
1. A rotor for a reluctance machine, the rotor comprising:
a substantially disc-shaped rotor body mounted on a rotor axis running through a rotor center point; and an alternating sequence of barrier regions and pole regions arrayed along a circumferential direction of the rotor body;

wherein each barrier region includes a multiplicity of magnetic flux barriers spatially and materially separated without overlap;

within at least one barrier region, at least one magnetic flux barrier is arranged with a q axis rotated with respect to a q axis of another magnetic flux barrier of the same barrier region;

wherein, with the exception of a rotation about the rotor axis, different barrier regions are identical to one another or are mirror-symmetrical with respect to an axis of the barrier regions; and wherein rotational angles and/or directions of rotation of q axes of one or more magnetic flux barriers with respect to q axes of other magnetic flux barriers of the same barrier region are selected in such a way that during the operation of the rotor a minimum torque ripple occurs in comparison with a rotor with a configuration without rotation of magnetic flux barriers;

wherein each respective barrier region includes three magnetic flux barriers spatially and materially separated without overlap;

wherein two magnetic flux barriers of each respective barrier region are arranged with their q axes corresponding directly to a q axis of the rotor; and a q axis of a third magnetic flux barrier of each respective barrier region is rotated with respect to the q axis of the rotor.

2. The rotor as claimed in claim 1, comprising an even number of barrier regions.

3. A reluctance machine comprising:

a stator for generating a primary magnetic field and/or for inducing a secondary magnetic field; and a rotor mounted so as to be rotatable about a rotor axis and surrounded by the stator;

the rotor comprising:

a substantially disc-shaped rotor body mounted on the rotor axis running through a rotor center point; and an alternating sequence of barrier regions and pole regions arrayed along a circumferential direction of the rotor body;

wherein each barrier region includes a multiplicity of magnetic flux barriers spatially and materially separated without overlap;

within at least one barrier region, at least one magnetic flux barrier is arranged with a q axis rotated with respect to a q axis of another magnetic flux barrier of the same barrier region;

wherein, with the exception of a rotation about the rotor axis, different barrier regions are identical to one another or are mirror-symmetrical with respect to an axis of the barrier regions; and wherein rotational angles and/or directions of rotation of q axes of one or more magnetic flux barriers with respect to q axes of other magnetic flux barriers of the same barrier region are selected in such a way that during the operation of the rotor a minimum torque ripple occurs in comparison with a rotor with a configuration without rotation of magnetic flux barriers;

wherein each respective barrier region includes three magnetic flux barriers spatially and materially separated without overlap;

wherein two magnetic flux barriers of each respective barrier region are arranged with their q axes corresponding directly to a q axis of the rotor; and a q axis of a third magnetic flux barrier of each respective barrier region is rotated with respect to the q axis of the rotor.

4. The reluctance machine as claimed in claim 3, wherein the stator comprises a concentrated winding.

5. The reluctance machine as claimed in claim 3, comprising at least one of a motor and a generator.

6. A vehicle comprising: a drive with a reluctance machine comprising:

a stator for generating a primary magnetic field and/or for inducing a secondary magnetic field; and a rotor mounted so as to be rotatable about a rotor axis and surrounded by the stator;

the rotor comprising:

a substantially disc-shaped rotor body mounted on the rotor axis running through a rotor center point; and an alternating sequence of barrier regions and pole regions arrayed along a circumferential direction of the rotor body;

wherein each barrier region includes a multiplicity of magnetic flux barriers spatially and materially separated without overlap;

within at least one barrier region, at least one magnetic flux barrier is arranged with a q axis rotated with respect to a q axis of another magnetic flux barrier of the same barrier region;

wherein, with the exception of a rotation about the rotor axis, different barrier regions are identical to one another or are mirror-symmetrical with respect to an axis of the barrier regions; and wherein rotational angles and/or directions of rotation of q axes of one or more magnetic flux barriers with respect to q axes of other magnetic flux barriers of the same barrier region are selected in such a way that during the operation of the rotor a minimum torque ripple occurs in comparison with a rotor with a configuration without rotation of magnetic flux barriers;

wherein each respective barrier region includes three magnetic flux barriers spatially and materially separated without overlap;

wherein two magnetic flux barriers of each respective barrier region are arranged with their q axes corresponding directly to a q axis of the rotor; and a q axis of a third magnetic flux barrier of each respective barrier region is rotated with respect to the q axis of the rotor.

* * * * *